United States Patent
Nguyen et al.

(10) Patent No.: US 6,393,539 B1
(45) Date of Patent: May 21, 2002

(54) SYSTEM AND METHOD FOR RELIABLY ASSIGNING AND PROTECTING DATA IN A CENTRALIZES STORAGE SYSTEM

(75) Inventors: Nam Nguyen; Ahmad Tawil, both of Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 09/565,020

(22) Filed: May 4, 2000

(51) Int. Cl.[7] .............................................. G06F 12/00
(52) U.S. Cl. ...................... 711/164; 711/163; 709/226; 709/104; 709/217; 713/183; 713/202; 713/201; 713/185
(58) Field of Search ................................ 711/164, 163, 711/170, 147, 152; 365/195; 709/203, 215, 104, 217, 226; 713/161, 166, 171, 172, 183, 202, 201, 185

(56) References Cited

U.S. PATENT DOCUMENTS

| | | | |
|---|---|---|---|
| 5,375,243 A | * 12/1994 | Parzych | 395/725 |
| 5,479,653 A | 12/1995 | Jones | 395/182.03 |
| 5,651,139 A | * 7/1997 | Cripe | 395/490 |
| 5,867,736 A | 2/1999 | Jantz | 395/894 |
| 5,896,493 A | 4/1999 | Rao | 395/182.04 |
| 5,941,972 A | 8/1999 | Hoese et al. | 710/129 |
| 5,949,882 A | * 9/1999 | Angelo | 380/25 |
| 5,960,451 A | 9/1999 | Voigt et al. | 711/114 |
| 5,975,738 A | 11/1999 | DeKoning et al. | 364/184 |
| 6,061,753 A | * 5/2000 | Ericson | 710/107 |
| 6,078,990 A | * 6/2000 | Frazier | 711/114 |
| 6,104,561 A | * 8/2000 | Braithwaite | 360/60 |
| 6,161,178 A | * 12/2000 | Cromer | 713/2 |
| 6,263,445 B1 | * 7/2001 | Blumenau | 713/201 |

* cited by examiner

*Primary Examiner*—Do Hyun Yoo
*Assistant Examiner*—Kimberly McLean
(74) *Attorney, Agent, or Firm*—Baker Botts L.L.P.

(57) ABSTRACT

A system and method for providing reliable access by a plurality of user systems in a computer network to data in a centralized storage system. The method includes the steps of placing all storage subunits of the centralized storage system in a default locked state wherein data stored in the storage subunits is not accessible by any user system, providing a user system with an initial key corresponding to a storage subunit, and the user system using the initial key to assign the storage subunit to itself so that no other user system can access data stored therein. When so assigned the storage subunit cannot be reassigned to another user system until the storage subunit has been placed back in the default locked state. One manner of implementing the above steps is using SCSI commands.

20 Claims, 4 Drawing Sheets

SYSTEM AND METHOD FOR RELIABLY ASSIGNING AND PROTECTING DATA IN A CENTRALIZES STORAGE SYSTEM

TECHNICAL FIELD

This invention relates in general to the field of computer networks, and more particularly, to a system and method for providing a reliable centralized storage system for a computer network.

BACKGROUND

Computer network storage capacity and reliability is becoming an increasingly important issue as computer usage continues to grow. Often, needed storage capacity exceeds that which can reasonably be offered by local storage devices such as CD-ROMs or hard drives. Work environments present additional challenges when designing storage systems since multiple users frequently must have access to and share at least some stored data. These users are often separately located, sometimes at great distances from one another. In addition to pressures to provide increasing amounts of storage and the ability to share stored data, users are also demanding faster access to that stored data. Centralized storage systems have become a popular way to address these demands.

A centralized storage system will typically consist of multiple storage subunits. These storage subunits may be individual disks, but to maximize storage capacity will generally consist of multiple disk arrays, which are multiple disks operating as one logical unit and accessible through a single disk controller. The controller is knowledgeable of the configuration of the array, and controls how data is stored amongst the disks in the array. Disk arrays will often exist in a RAID configuration (redundant array of inexpensive disks). The fundamentals of RAID storage configurations and the various "levels" of configurations are well known in the art, and are described in detail in a 1987 book authored by David A. Patterson et al., from University of California at Berkeley entitled *A Case for Redundant Arrays of Inexpensive Disks (RAID)*.

Centralized storage systems are typically accessible by multiple users through one or more servers. For centralized storage systems having a limited number of disk arrays accessed by a relatively small number of users that are centrally located, the storage system may be accessed via a SCSI (small computer systems interface) bus using SCSI protocol. The SCSI interface and protocol are well known and described in the SCSI-1, SCSI-2, and SCSI-3 specifications. A disadvantage of SCSI is that it provides a transport medium that is effective only if the communication path is relatively short. Further, SCSI limits the number of accessible devices (i.e., disk arrays) and the number of servers, and supports only the SCSI communication protocol.

Because access to centralized storage systems can become the largest bottleneck affecting the entire computer network, the limitations of the SCSI interface become too great for most networks. Under such circumstances, Fibre Channel technology can be used to interface with centralized storage system. Fibre Channel is a well known industry standard I/O channel that supports multiple communication protocols, such as SCSI and IPI, supports data rates that surpass that of SCSI, and supports different architectures for interconnecting computer networks with a centralized storage system, such as a loop architecture or a switch (fabric) architecture. Fibre Channel technology can support a very large amount of storage, but is also expensive. Accordingly, the demands to provide an adequate and reliable centralized storage system are even greater.

As indicated above, centralized storage systems typically consist of multiple storage subunits such as disk arrays. Each server will typically be assigned to have access to data stored in one or more designated disk arrays within the centralized storage system. In some circumstances, the same disk array will be shared by two or more servers operating in a cluster environment. The disk array(s) assigned to each server are each viewed by the server as a single logical unit, or "LUN" (an acronym for logical unit number). For example, the server will view a RAID disk array as a single LUN rather than individual disks.

Many difficulties arise when trying to reliably assign storage subunits within the centralized storage system to individual servers. For example, when some servers, such as NT servers, boot up they scan all devices on the network. Thus, the server will scan all storage subunits in the centralized storage system and try to "mount" each one, or make each one accessible to its own applications by assigning a drive letter to that storage subunit. During this time, the server could attempt to write to that storage subunit, potentially corrupting data if another server is also attempting to read or write to that storage subunit.

Several methods have been used in attempting to reduce the potential for corruption in a centralized storage system that is accessible by multiple servers. One solution is to provide a filter driver associated with the server. A filter driver is software resident at the server that is programmed with information regarding the storage subunits assigned to that server in order to prevent any applications running on the server's network from accessing storage subunits other than the assigned ones. The use of filter drivers, however, present reliability problems that can never be overcome; the potential for human error. Since filter drivers must be programmed by an individual, programming errors in properly assigning storage subunits will always be possible. Further, filter drivers cannot protect against additional servers having access to the centralized storage system being installed without filter drivers, or servers being installed at a later date and programmed to have access to the same storage subunits. Both of these events could result in servers competing for access to the same storage device, which could compromise the integrity of the centralized storage system. An alternative is to provide a master software application governing all servers in the network, rather than having a filter driver at each server. This is not a true solution in that it still subject to programming error, and will not prevent potential corruption in the event that a server is added or removed without reprogramming the master software.

Another method that has been applied is using a device driver having some LUN masking capability. A device driver is a hardware driver at the server location that performs the same function as a filter driver, but at a lower level. A miniport driver with LUN masking capability uses a standard Host Bus Adapter (HBA) that has a LUN masking feature added to it. At the time of booting, a miniport driver with LUN masking capability will report to the server only those LUNs (storage subunits) that the server is to have access to, essentially preventing the server from seeing any LUNs other than those assigned to it. These devices, however, suffer from the same problems described above, including the potential for programming mistakes, and the inability to control potentially corrupting competing access by servers.

Finally, ID ranges have also been used in an attempt to increase reliability of centralized storage systems and the integrity of the data stored therein. Each server is provided with an individual ID. The centralized storage system contains software that recognizes the server by that ID, and is programmed to know which servers have access to which storage subunits. As with filter drivers and miniport drivers having LUN masking capabilities, this method is subject to the problems described above. Further, since each server and its access to designated storage subunits is identified by a unique number, the software must be reprogrammed if a server is added or removed, or even if an adapter card in one of the servers is replaced.

Each of the methods described above do not adequately protect data in the centralized storage system against administrative error during the configuration process, or protect against improper competing access by servers that may occur when servers are added or removed from the network.

SUMMARY

Therefore, a need has arisen for a centralized storage system in which storage subunits can be allocated among multiple user systems in a reliable manner such that the integrity of data stored therein is better protected against user systems competing for access to that data, and otherwise better protected against corruption.

In accordance with the present disclosure, a method is described for providing access by a plurality of user systems to data in a centralized storage system, the centralized storage system having a plurality of storage subunits for storing the data. The method includes the steps of placing the plurality of storage subunits in a default locked state wherein data in the storage subunit is not accessible by any user system, and providing at least one of the plurality of user system with an initial key corresponding to at least one storage subunit. The method further includes the step of one of the user systems provided with the initial key using the initial key to assign at least one of the corresponding storage subunits to itself, wherein when assigned to itself data in the at least one storage subunit is accessible only by the one user system and wherein the at least one storage subunit cannot be assigned to another user system until it has been placed back in the default locked state.

According to one embodiment, the step of assigning the at least one corresponding storage subunit to itself further includes the steps of the one user system providing the initial key and a new identifier to the at least one storage subunit, and the at least one storage subunit replacing the initial key with the new identifier.

According to another embodiment, the method further includes the step of the one user system determining the lock status of the storage subunit, and the user system performing the using step if it is determined that the storage subunit is in the default locked state.

According to yet another embodiment, SCSI commands are used to provide the initial key and the new identifier to the at least one storage subunit, and to perform the determining step.

In yet another embodiment, a SCSI Persistent Reserve Out command with a service action of PREEMPT is used to assign the at least one storage subunit to the user system. In another embodiment, a SCSI Persistent Reserve In command with a service action of READ RESERVATION is used to perform the determining step.

A computer network is also provided including a centralized storage system having a plurality of storage subunits for storing data thereon, and a plurality of user systems coupled to the centralized storage system by a communication channel, wherein each of the plurality of storage subunits are capable of existing in a default locked state wherein data stored thereon is not accessible by any of the user systems, and an assigned state wherein data stored thereon is accessible only by a single user system to which it is assigned. Each of the plurality of storage subunits are assignable only to a user system having an initial key corresponding to the storage subunit, and only when the storage subunit is in the default locked state.

In another embodiment, the user system having the initial key is capable of using the initial key to cause the corresponding storage subunit to enter an assigned state in which the storage subunit is assigned to the user system.

In yet another embodiment, the user system is capable of assigning the storage subunit to itself by providing the initial key and a new identifier to the storage subunit, and causing the storage subunit to replace the initial key with the new identifier.

In yet another embodiment, the user system having the initial key is capable of using SCSI commands to assign the corresponding storage subunit to itself.

A method is also provided for assigning a storage subunit of a centralized storage system to one of a plurality of user systems. The method includes the steps of providing the storage subunit in a default locked state wherein it can only be assigned to a user system having an initial key, providing the initial key to the one user system, the one user system providing the initial key and a new identifier to the storage subunit, and the storage subunit entering an assigned state wherein data stored therein can only be accessed by the one user system using the initial key.

According to one embodiment, the method further includes the step of, after the storage subunit has entered the assigned state, the user system providing the storage subunit with the, new identifier and the initial key, and the storage subunit re-entering the default locked state.

Finally, in yet another embodiment, SCSI commands are used by the user system to provide the initial key and the identifier to the storage subunit.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the Figures, like numeral being used to refer to like and corresponding parts of the various drawings.

Figure 1:
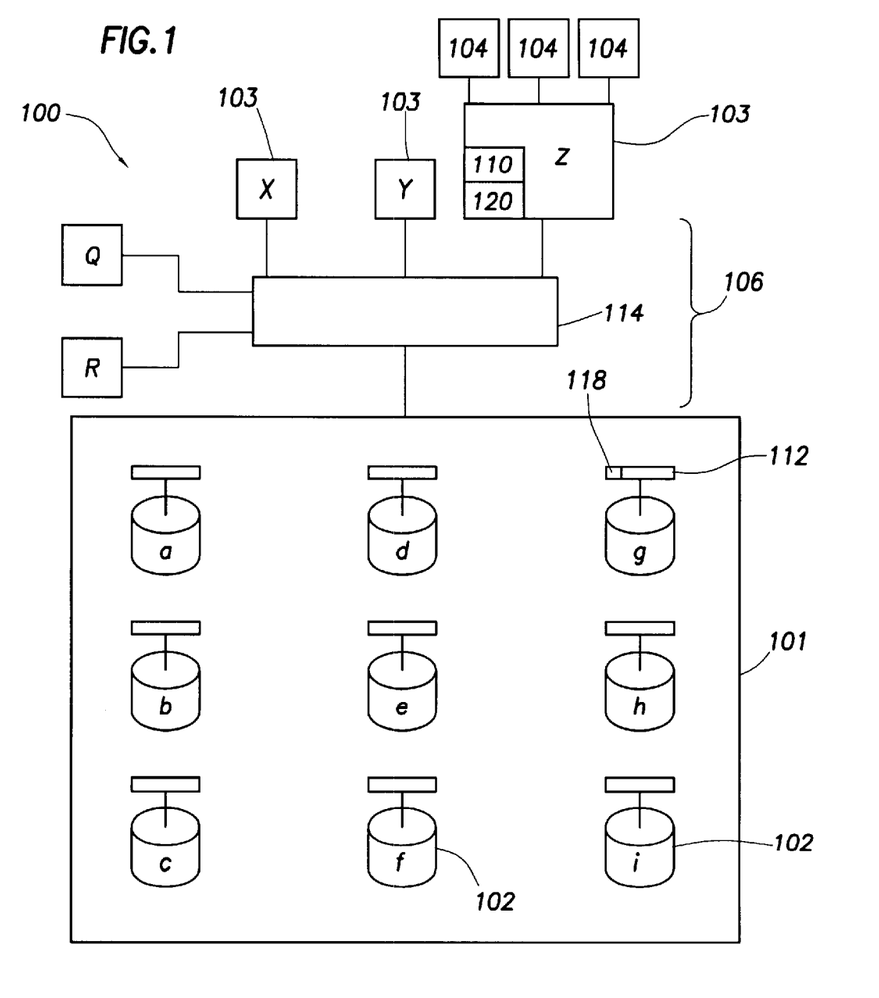
FIG. 1 depicts a block diagram of a computer network in which multiple user systems utilize a centralized storage system.

FIG. 1 illustrates a computer network 100 in which multiple user systems 103 share a centralized storage system 101. The centralized storage system 101 includes a plurality of storage subunits 102. Each of these storage subunits 102 could be an individual disk, but preferably includes multiple disks arranged as an array, such as in a RAID configuration. In the case of a disk array, the array is accessed through disk controller 112. Storage subunits 102 could also be any other type of storage device, such as optical disks, tape drives, or any other suitable storage means. Multiple user systems 103 access centralized storage system 101, and each user system preferably consists of an individual server, but may also consist of multiple servers operating, for example, in a cluster environment. In one embodiment, multiple user terminals 104 are each coupled to the server 103, enabling multiple users to access data in the centralized storage system through the server.

User systems 103 communicate with centralized storage system 101 via communication channel 106. A well known bus interface 110, such as a host bus adapter (HBA), enables user system 103 to access centralized storage system 101 over communications channel 106. As will be understood by one skilled in the art, communication channel 106 may be any known interface that will support the desired communication protocol, will provide a sufficient data transfer rate, will support the desired size of the centralized storage system, and can be implemented across the desired distance between the user systems and the centralized storage system. As indicated above, for some applications communication channel 106 may be a SCSI bus. A preferred embodiment, however, employs Fibre Channel technology for communication channel 106. Using Fibre Channel technology, each user system may be coupled to a "Fabric" or switching network 114 that is coupled to centralized storage system 101 and that controls the flow of communications into and out of centralized storage system 101. Any other suitable Fibre Channel architecture may also be used, as may any other type of communication channel sufficient to meet the demands of the computer network.

In a typical centralized storage system, selected storage subunits 102 will be allocated to each user system 103. For example, storage subunits a, b, and c may be allocated to user system X, whereas storage subunit d may be allocated to user system Y. Similarly, storage subunits g and h may be allocated to user system Z. Storage subunits may also be allocated to more than one user system operating in a cluster environment, such as storage subunits e and f being allocated to user systems Q and R. According to the system and method described below, each storage subunit will be efficiently and reliably allocated to the appropriate user system(s).

Figure 2:
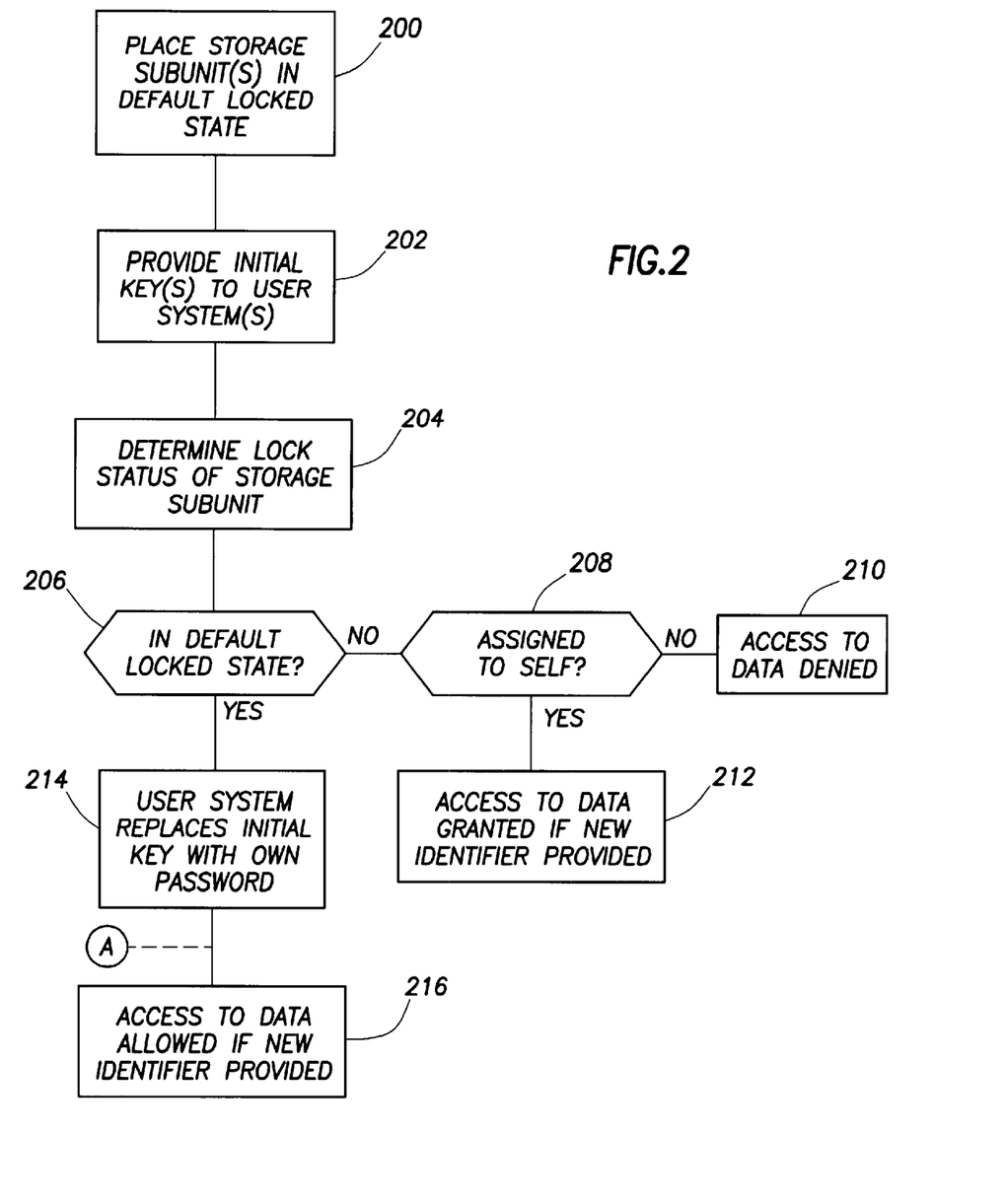
FIG. 2 depicts a flow diagram of reliably assigning a storage subunit of a centralized storage system to a user system.

Referring now to FIG. 2, to efficiently and reliably allocate storage in a centralized storage system such as that shown in FIG. 1, all storage subunits in the centralized storage system are initially placed in a initial or default "locked" state in step 200. This can be done, for example, before the centralized storage system is installed at a customer location. In this default locked state, data in the storage subunit cannot be accessed by any user system until the storage subunit is first assigned to a user system using a predetermined initial key as described more fully below. Thus, in order for any user system to assign a selected storage subunit to itself, the user system must first be provided with the predetermined initial key corresponding to the selected storage subunit at step 202. The predetermined initial key can be any type of identifier, such as any string of characters or letters, or any algorithm that will be uniquely recognized by the storage subunit. For example, the initial key could be a serial number, a worldwide name, or an address on the network.

Once a user system has been provided with the initial key, the user system and storage subunit communicate with one another to advise the user system of the lock status (or the assigned status) of the storage subunit in step 204. According to one embodiment, based on information received or obtained from the storage subunit, the user system will determine whether the storage subunit is in the default locked state or whether it has already been assigned to itself or another user system (an "assigned lock state") at steps 206 and 208. If the storage subunit has already been assigned to itself then the user system will be granted access to data stored in the storage subunit if the appropriate identifier is provided to the storage subunit, as described below. If the storage subunit is not in the default locked state and has not been assigned to itself, this will typically indicate that it has been assigned to another user system. Regardless, access to data will be denied at step 210. Access or denial to data in the storage subunit is controlled by software 118 resident at the storage subunit 112 (see FIG. 1), such as in the disk controller of a disk array.

If the storage subunit is in the default locked state, the user system may proceed to assign the storage subunit to itself by providing the initial key and a new identifier to the storage subunit, and causing the storage subunit to replace the initial default key with the new identifier at step 214. This new identifier will be unique to that user system and, similar to the initial key, can be any string of characters, letters, or numerals. Software 118 is also programmed to recognize and accept only the predetermined initial key before taking any further action at the request of a user system, but once the initial key is recognized and accepted, the storage subunit will allow the switch to occur, and will subsequently allow access only by the user system if it first provides the new identifier (step 216). In the assigned state, access to data stored on the storage subunit is only granted to the user system to which the storage subunit has been assigned. Further, although any user systems having the initial key may assign to itself any storage subunit that is in the default locked state, the storage subunit can only be assigned to one user system at any given time and can only be assigned when in the default locked state, thereby allowing access to data stored thereon by only one user system at any given time.

According to one embodiment, all storage subunits 102 are programmed to recognize and accept the same initial key, and all servers on the network are initially provided with this initial key. In alternate embodiments, different storage subunits may be programmed to recognize and accept different initial keys, and different user systems may be provided with different ones of these initial keys.

Figure 3:
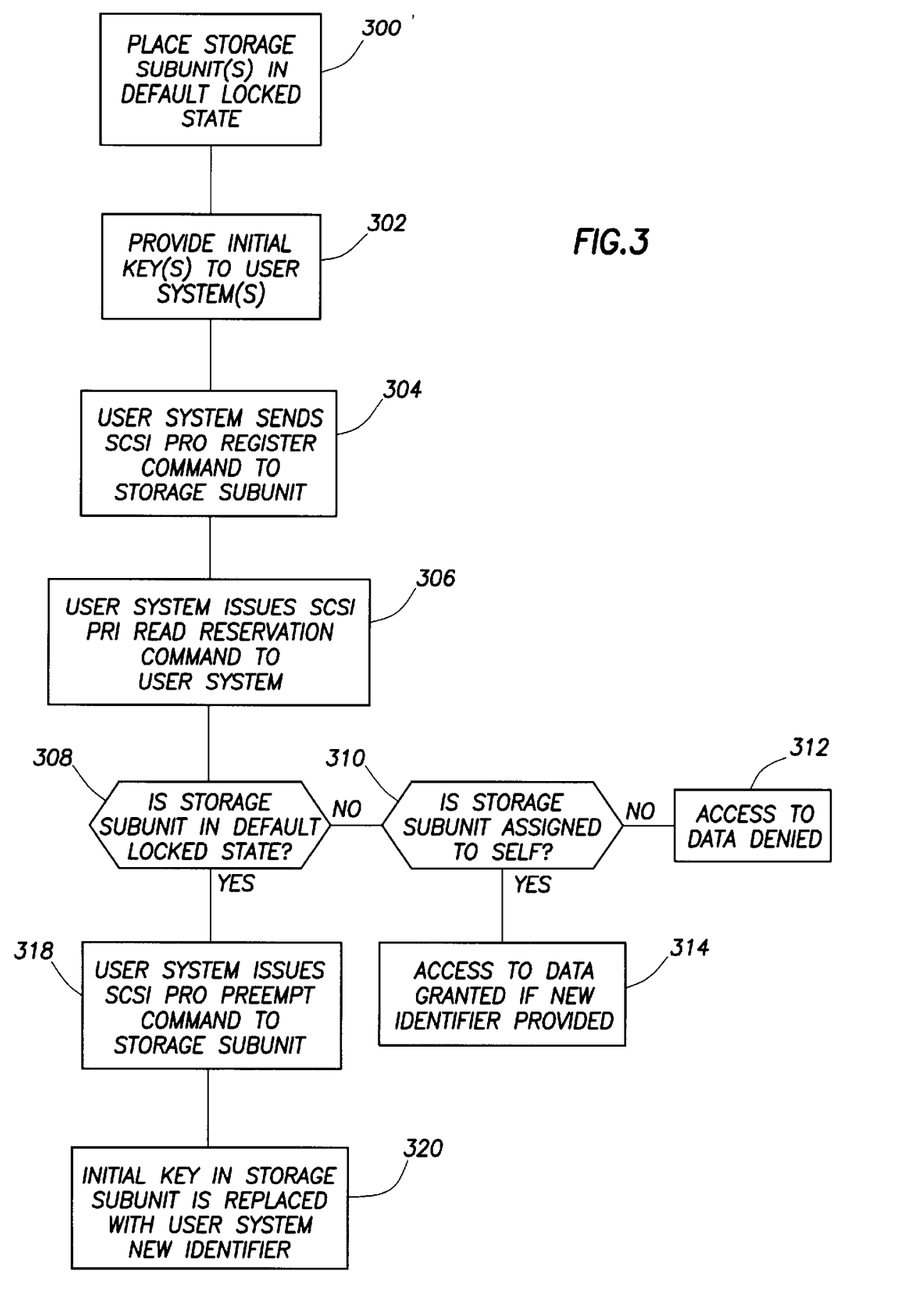
FIG. 3 depicts a flow diagram of reliably assigning a storage subunit of a centralized storage system to a user system using SCSI commands.

Referring now to FIG. 3, the system and method described above may be implemented using SCSI protocol (in particular SCSI-3 protocol), and software 120 (FIG. 1) in the user system and software 118 in the storage subunit that is programmed to issue and/or recognize these SCSI commands. As described above, each storage subunit is initially placed in a default locked state (step 300), and at least one user system is provided with the initial key corresponding to a selected storage subunit (step 302). During boot up, the user system will identify itself to the storage subunit in step 304 by sending a SCSI Persistent Reserve Out (PRO) command with a service action of REGISTER to the storage subunit. Next, at step 306, the user system issues a SCSI Persistent Reserve In (PRI) command with service action of READ RESERVATION to read the assigned (or lock) status of the storage subunit. The user system will examine the assigned status of the storage unit and at steps 308 and 310 determine whether it is in the default locked state, or whether it has been assigned to itself or another user system. If in an assigned locked state in which the storage subunit is assigned to another user system, access to data stored in the storage subunit will be denied (step 312). If in an assigned locked state in which the storage subunit has been assigned to itself, the user system will be granted access to the data if it first provides the proper new identifier (step 314).

If the storage subunit is in the default locked state, the user system will issue a SCSI PRO command with a service action of PREEMPT at step 318. As will be understood by those skilled in the art, this command enables the user system to provide the initial key and a new identifier to the storage subunit, and to replace the initial key with this new identifier (step 320). Once the initial key is replaced with the new identifier, the storage subunit will no longer respond to a user system offering the initial key, but rather will respond only to a user system offering the new identifier, which is known only by the user system that established it. In this manner, the state of the storage subunit is changed from the default locked state to an assigned locked state in which it is assigned or reserved for that user system. Subsequently, access to data in the storage subunit will be granted if the user system first provides the new identifier (step 322). Software (118) at the storage subunit is programmed to recognize the above SCSI commands, recognize the initial key, to accept a subsequently supplied new identifier, and to thereafter allow access to data only when the new identifier is first provided to it. Such software will be well known to those skilled in the art, as SCSI protocol and commands, and the software to implement such commands, are well known.

Figure 5:
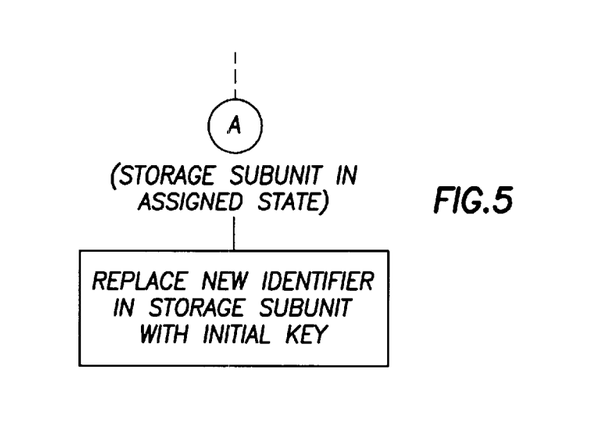
FIG. 5 depicts a flow diagram of returning a storage subunit that is in an assigned state to the default locked state.

The presently described system and method also enables storage subunits that have been assigned to be returned to the default locked state so that they may be assigned to a different user system. This may be necessary when a user system fails or must otherwise be removed from the network, or simply if a user system desires to relinquish its assigned storage. Referring now to FIGS. 2 and 5, a storage subunit that is in an assigned state (see point A of FIG. 2) may be placed back in the default locked state by replacing the new identifier (from the user system to which it has been assigned) in the storage subunit with the initial key at step 502. This will cause the storage subunit to assume its initial default locked state described above, since the storage subunit will now respond to a user system that provides only the initial key. Another user system having the initial key may then assign the storage subunit to itself by following steps 204–216 of FIG. 2. In one embodiment, if the user system is still operational, the user system itself is capable of placing the storage subunit back in the default locked state by issuing a SCSI PRO command with a service action of PREEMPT, this time providing the new identifier and initial key, and swapping the former for the latter. In the event that the user system has failed, software controlling network functionality, such as a system administrator, can be programmed or otherwise enabled to restore the storage subunit to its default locked state.

Figure 4:
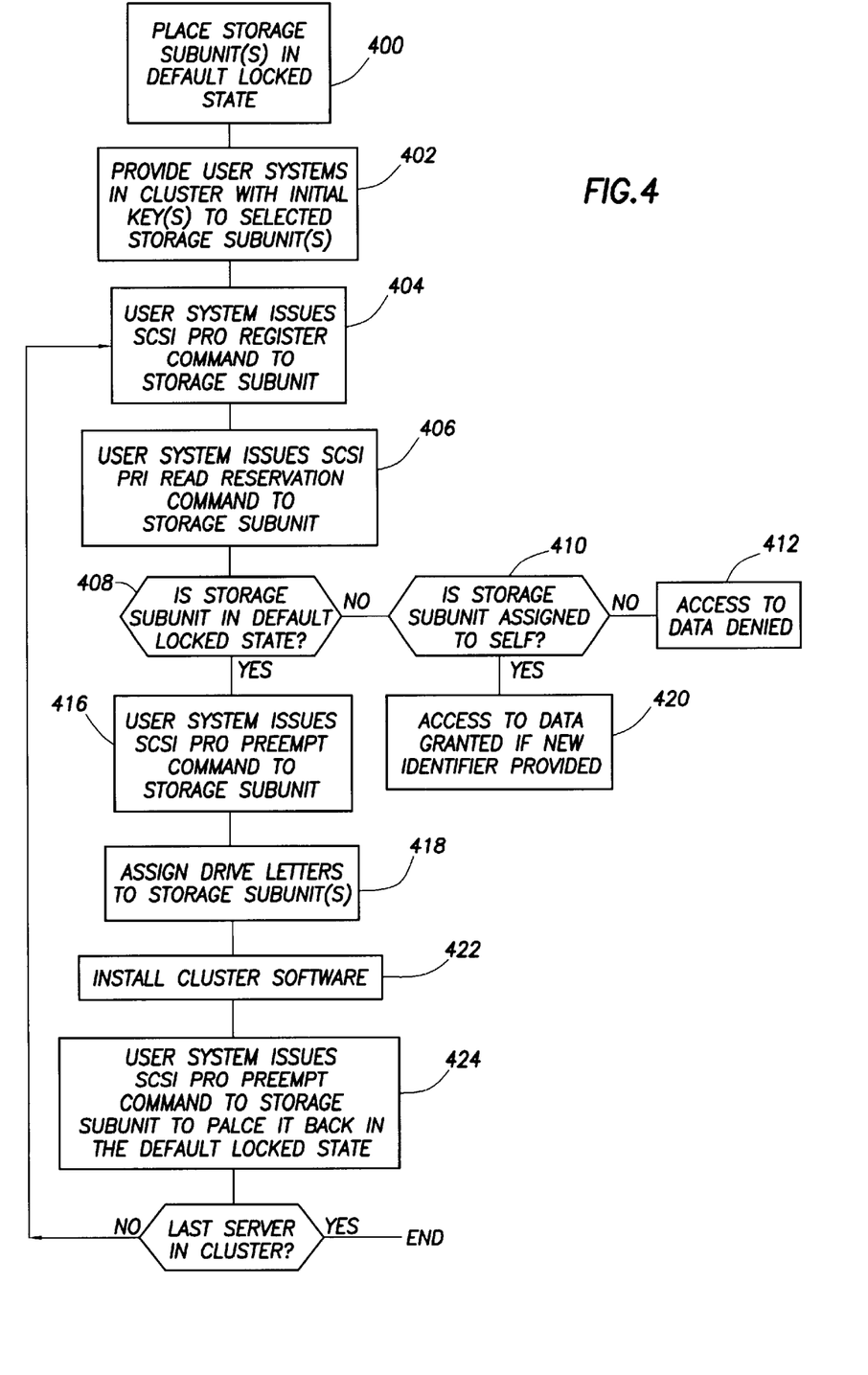
FIG. 4 depicts a flow diagram of reliably assigning a storage subunit of a centralized storage system to user systems in a cluster environment.

The system and method described above is also applicable to user systems operating in a cluster environment where multiple servers have access to the same storage subunits. For example, user systems Q and R in FIG. 1 may both have access to storage subunits e and f. Referring now to FIG. 4, storage subunits are first placed in the default locked state, and the user systems in the cluster are provided with the initial key to selected storage subunit(s) they are to share in steps 400 and 402. A first server in the cluster will send a Persistent Reserve Out command with a service action of REGISTER (step 404), followed by a SCSI Persistent Reserve In (PRI) command with a service action of READ RESERVATION (step 406). By using the READ RESERVATION command, the user system determines the assigned status of the storage subunit in the same manner as described above in reference to FIG. 3. Thus, the user system will determine whether the storage subunit is in the initial default locked state (step 408), or an assigned state (step 410). If in the default state, the user system will issue a SCSI PRO command with a service action of PREEMPT at step 416. As is also described above, with this PREEMPT command the user system provides the initial key and a new identifier to the user system, and directs the storage subsystem to replace the former with the latter so that it becomes assigned to that user system.

Subsequently, the server will assign drive letters to each storage subunit that is to be accessible to the cluster (step 418), and cluster software will then be installed on the server (step 422). Cluster server software is well known software, such as Microsoft® Cluster Server® software, that must be installed on each server that is to operate in a cluster environment. Once completed, the server will again issue a PRO command with a service action of PREEMPT in step 424. This time, however, the user system provides the new identifier and initial key to the storage subunit, and instructs the storage subunit to exchange the former for the latter to place the storage subunit back in the default locked state so that it may be accessed by and assigned to another server in the cluster. The next server in the cluster will then access the storage subunit and perform steps 404–424. Each remaining server in the cluster will follow. To ensure that the above described system and method works correctly in a cluster environment, the HBA driver or the cluster driver must be programmed to issue these SCSI Persistent Reserve Out command with a service action of PREEMPT, using the initial key and the new identifier to reserve the storage subunit in place of the SCSI Reserve command, and using the SCSI PRO command with a service action of PREEMPT, using the new identifier and the initial key to place the storage subunit back in the default locked state, in place of the SCSI Release and Bus Reset commands.

The system and method described above provides a more reliable centralized storage system in which the integrity of data stored therein is protected against corruption. Since storage subunits can only be assigned to a user system when in the default locked state, and can only be and assigned by a user system having the proper initial key, the system and method ensures that servers that do not have the appropriate software and key installed will, under no circumstances, be able to access and/or corrupt data stored on a storage subunit. Further, since assignment of a storage subunit to a user system requires a new identifier to be established by the user system, storage subunits can only be assigned to a single user system at any given time, thereby preventing competing user systems from simultaneously attempting to read or write to the same storage subunit. This goal is further insured by the fact that the storage subunit must be returned to the default locked state before it can be assigned to another user system.

Although the present invention has been described in detail, it should be understood that various changes, substitutions and alterations can be made hereto without departing from the spirit and scope of the invention as defined by the appended claims.

What is claimed is:

1. A method for providing access by a plurality of user systems in a computer network to data in a centralized storage system, said centralized storage system having a plurality of storage subunits for storing said data, said method comprising the steps of:

placing said plurality of storage subunits in a default locked state wherein data in said storage subunit is not accessible by any user system;

providing at least one of said plurality of user systems with an initial key corresponding to at least one storage subunit; and one of said user systems provided with said initial key using said initial key to assign at least one of said corresponding storage subunits to itself; wherein when assigned to itself, data in said at least one storage subunit is accessible only by said one user system, and wherein said at least one storage subunit cannot be assigned to another user system until said at least one storage subunit has been placed back in said default locked state.

2. The method according to claim 1, wherein said using step further comprises the steps of:

said one user system providing said initial key and a new identifier to said at least one storage subunit; and said at least one storage subunit replacing said initial key with said new identifier so as to allow access to data stored therein only by said user system using said new identifier.

3. The method according to claim 2, further comprising the step of:

said user system determining an assigned status of said storage subunit, said user system performing said using step if it is determined that said storage subunit is in said default locked state.

4. The method according to claim 3, wherein SCSI commands are used to provide said initial key and said new identifier to said at least one storage subunit, and to perform said determining step.

5. The method according to claim 4, wherein a SCSI Persistent Reserve Out command with a service action of PREEMPT is used to assign said at least one storage subunit to itself.

6. The method according to claim 5, wherein a SCSI Persistent Reserve In command with a service action of READ RESERVATION is used to perform said determining step.

7. The method according to claim 6, wherein said user systems are servers.

8. The method according to claim 7, wherein said computer network further comprises a plurality of user terminals coupled to one of said servers, said plurality of user terminals being capable of communicating with said centralized storage system through said one server.

9. A computer network comprising:

a centralized storage system having a plurality of storage subunits for storing data thereon; and a plurality of user systems coupled to said centralized storage system by a communication channel, each of said plurality of storage subunits being capable of existing in a default locked state wherein data stored thereon is not accessible by any of said user systems, and an assigned state wherein data stored thereon is accessible only by a single user system to which it is assigned, each of said plurality of storage subunits being assignable only to a user system having an initial key corresponding to said storage subunit, and only when said storage subunit is in said default locked state.

10. The computer network according to claim 9, wherein a user system has been provided with said initial key corresponding to said storage subunit.

11. The computer network according to claim 10, wherein said user system having said initial key is capable of using said initial key to cause said corresponding storage subunit to enter said assigned state in which said storage subunit is assigned to said user system.

12. The computer network according to claim 11, wherein said user system is capable of assigning said corresponding storage subunit to itself by providing said initial key and a new identifier to said storage subunit, and causing said storage subunit to replace said initial key with said new identifier.

13. The computer network according to claim 12, wherein said user system is capable of using SCSI commands to assign said storage subunit to itself.

14. The computer network according to claim 13, wherein said plurality of user systems are servers.

15. The computer network according to claim 14, further comprising a plurality of user terminals coupled to at least one of said servers, said plurality of user terminals being capable of communicating with said centralized storage system through said one server.

16. A method for assigning a storage subunit of a centralized storage system to one of a plurality of user systems so that data stored in said storage subunit may be accessed by said one user system, said method comprising the steps of:

providing said storage subunit in a default locked state wherein it can only be assigned to a user system having an initial key;

providing said initial key to said one user system;

said one user system providing said initial key and a new identifier to said storage subunit; and said storage subunit entering an assigned state wherein said data stored therein can only be accessed by said one user system using said new identifier.

17. The method according to claim 16 further comprising the steps of after said storage subunit has entered said assigned state, said one user system providing said storage subunit with said new identifier and said initial key; and said storage subunit re-entering said default locked state.

18. The method according to claim 17, wherein SCSI commands are used by said user system to provide said initial key and said new identifier to said storage subunit.

19. The method according to claim 18, wherein a SCSI Persistent Reserve Out command with a service action of PREEMPT is used by said user system to provide said initial key and said new identifier to said storage subunit, and to cause said storage subunit to enter said assigned state.

20. The method according to claim 19, wherein a SCSI Persistent Reserve Out command with a service action of PREEMPT is used by said user system to provide said initial key and said new identifier to said storage subunit, and to cause said storage subunit to re-enter said default locked state.

* * * * *

UNITED STATES PATENT AND TRADEMARK OFFICE
CERTIFICATE OF CORRECTION

PATENT NO.   : 6,393,539 B1
DATED        : May 21, 2002
INVENTOR(S)  : Nguyen et al.

It is certified that error appears in the above-identified patent and that said Letters Patent is hereby corrected as shown below:

<u>Title page, Item [54] and Column 1, lines 1-3,</u>
The title should read:
-- SYSTEM AND METHOD FOR RELIABLY ASSIGNING AND PROTECTING DATA IN A CENTRALIZED STORAGE SYSTEM --

Signed and Sealed this

Sixth Day of January, 2004

JAMES E. ROGAN
*Director of the United States Patent and Trademark Office*